June 5, 1934. C. E. ARMSTRONG 1,961,544
THERMOSTATIC TEMPERATURE CONTROL
Filed June 13, 1931 2 Sheets-Sheet 2
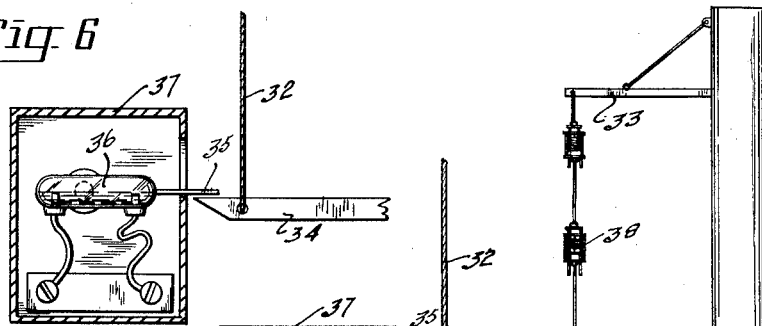
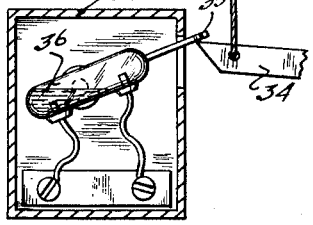
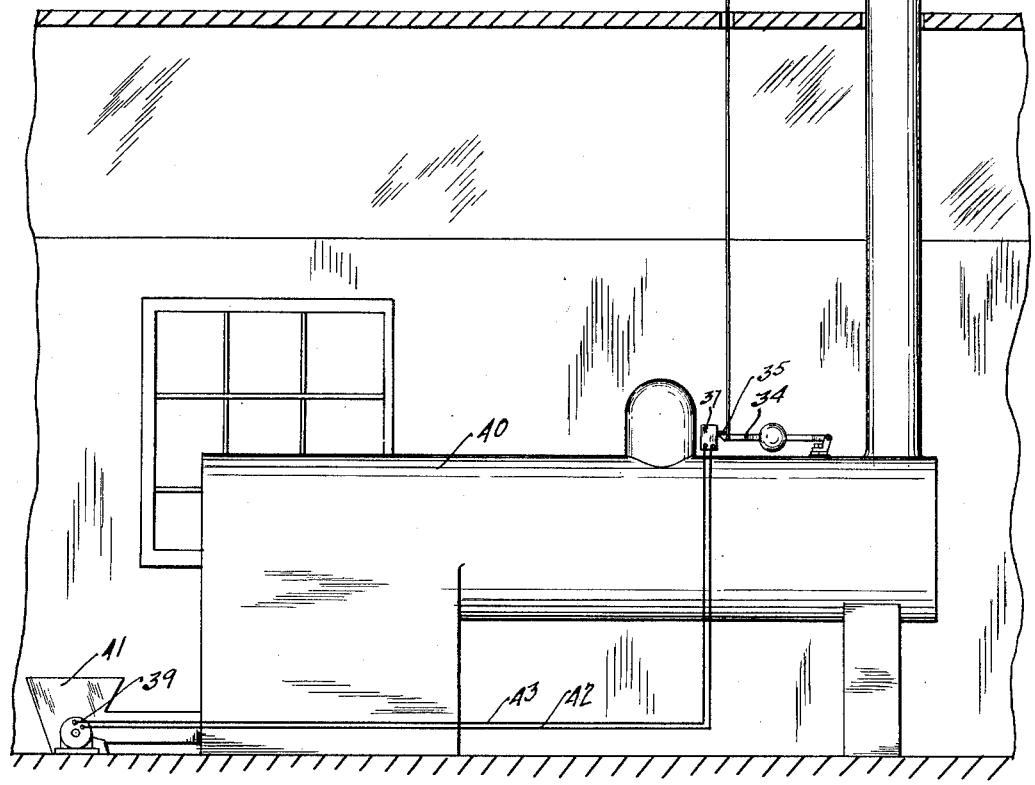
Charles E. Armstrong
Inventor
Attorney Patented June 5, 1934

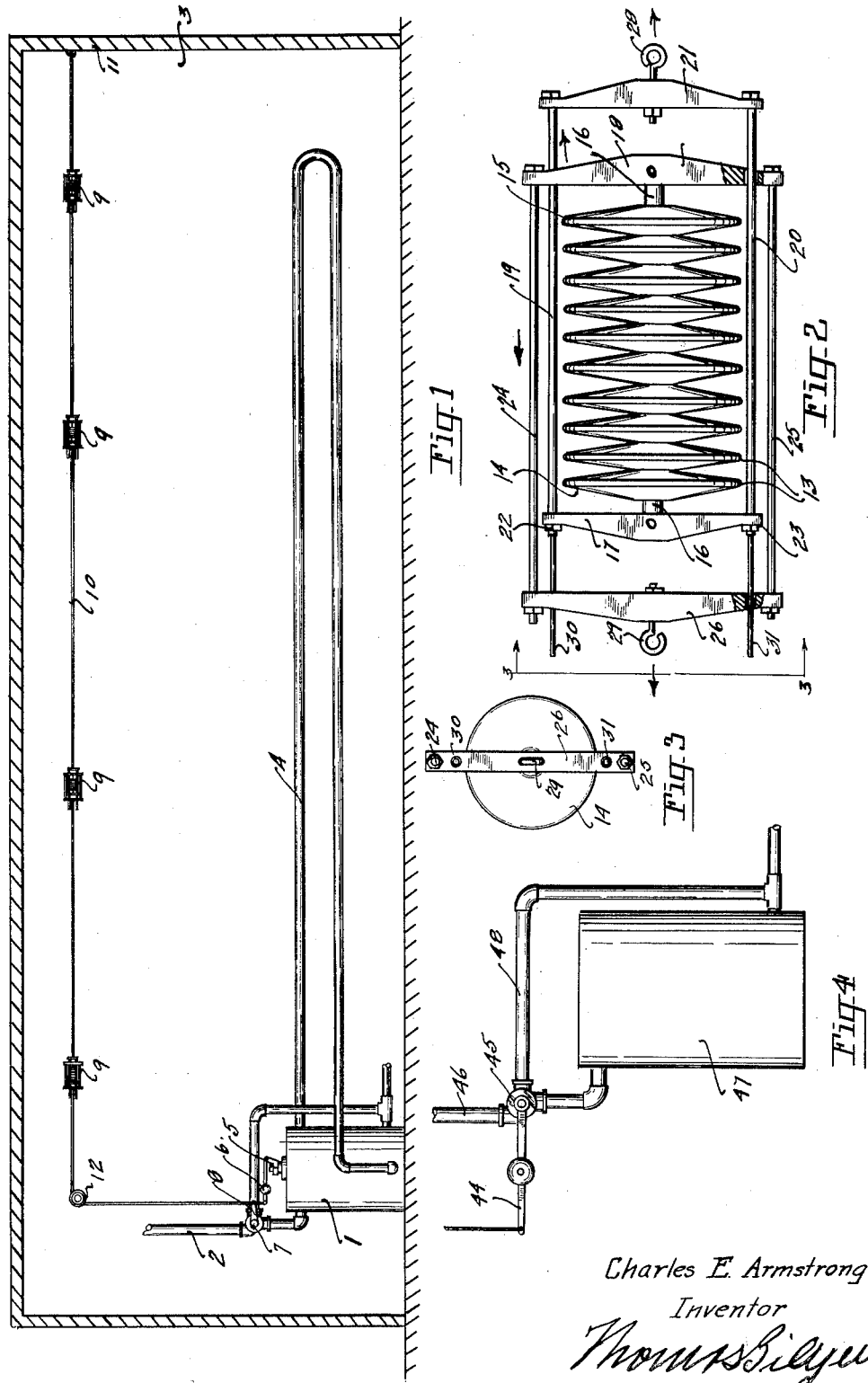

1,961,544

UNITED STATES PATENT OFFICE 1,961,544

THERMOSTATIC TEMPERATURE CONTROL

Charles E. Armstrong, Corvallis, Oreg., assignor to Armstrong Heat Control Co., a corporation of Oregon Application June 13, 1931, Serial No. 544,262

5 Claims. (Cl. 236—99)

My invention relates to thermostat controls and is particularly adapted for controlling temperature as an average temperature. Heretofore the thermostats have been developed for controlling heat regulators. The control to be indicated at a central point. The present devices in no way indicate an average temperature requirement at different floor levels, or at different locations upon the same floor.

In my new and improved device I have provided a thermostat that may be hooked up in series to indicate an average temperature requirement in various localities, of the same buildings, or at different locations in different buildings. While I have not shown in the drawings the same as being adapted for indicating an average temperature upon different floors, I have shown in the drawings a device for indicating an average temperature control located at different elevations.

My device is comprised of a plurality of wafers in a single assembly mounted between yokes adapted for developing a tension within a common line to thereby control a heat developing device remotely disposed relative to the thermostats, the thermostats being adapted for being placed within a common line spaced apart horizontally, or vertically. This same hook-up may be used with equal facility for indicating an average temperature at remote places and at remote distances, both horizontal and vertical from the central station to which the heat regulator is to be controlled.

One of the objects of my invention is to develop a heat regulating device for use in green houses for controlling the heat to be developed at a central plant from which the heat is to be drawn for the heating of a number of green houses, or for maintaining an average temperature in a single green house, that is of substantial area, or length and that is remotely disposed relative to the central heating plant.

A further object of my invention consists in providing a simply constructed device for use in green houses, incubating plants and in other industries wherein a central station is maintained for supplying the heat.

The object of my device being to provide a thermostat control mechanism for the maintaining of an average temperature within the various green houses, or incubator rooms, or buildings or machines.

A still further object of my invention consists in providing a heat controlling regulator comprised of a plurality of units that may be hooked up in series for the regulating and controlling of the heat supply that is developed remotely distanced from the thermostat mechanisms.

A still further object of my invention consists in providing a simply constructed device that may be hooked up in series and at different elevations for the regulating of a stoker for a boiler, through associated elements that are used for developing a heat supply as indicated for requirement at different elevations and at remote stations relative to the stoking plant.

A still further object of my invention consists in providing a device adapted for being used in conjunction with a heat transformer that will regulate the flow of heat supplying fluid through a heat transformer from a remote control station.

With these and incidental objects in view, the invention consists in certain novel features of construction and combination of parts, the essential elements of which are set forth in the appended claims, and a preferred form of embodiment of which is hereinafter shown with reference to the drawings which accompany and form a part of this specification.

In the drawings:

Fig. 1 is a sectional, side view of a room in which a heat transformer is located and from which a heat supply radiating system emanates, and illustrating a plurality of thermostats hooked up in series for regulating the amount of heat supplying fluid that will be permitted to flow through the heat transformer.

Fig. 2 is a side view of one of the heat regulating devices that is hooked up in the series.

Fig. 3 is an end view of the mechanism illustrated in Fig. 2. The same being taken on line 3—3 of Fig. 2, looking in the direction indicated.

Fig. 4 is a side view of a heat transformer and illustrating a counterweighted arm associated with the valve of a heat transformer for regulating the amount of heated fluid that will be permitted to flow through the heat transformer.

Fig. 5 is a side view of a boiler and of a stoker associated therewith, and having a plurality of heat regulators disposed at different elevations, hooked up in a series upon a common line, or cord, the same being adapted for actuating a mercury switch that is disposed in an electric control line leading to the electric prime mover of the stoker and adapted for energizing the prime mover when the mercury switch is actuated.

Fig. 6 is a sectional side view of the control box that is associated with the counterweighted arm that is adapted for being actuated by the line upon which the thermostat control mechanisms are disposed at different positions. The lever is shown out of contact with the mercury switch.

Fig. 7 is a sectional side view of the mechanism illustrated in Fig. 6, and illustrating the counterweighted lever, as being in engagement with the mercury switch and for tilting the same.

Like reference characters refer to like parts throughout the several views.

My device is adapted for being used in conjunction with a heat transformer, as illustrated in Fig. 1. The heat transformer being illustrated at 1. The heat supplying medium is supplied to the heat transformer through a supply pipe 2, leading from a source of heat supply not here shown. The room 3 is adapted for being heated by a radiating pipe 4 that is adapted for circulating the heated fluid through the heat transformer 1. A heat regulator 5 is mounted upon the exterior of the transformer 1 and a counterweighted lever 6 is adapted for being actuated by the heating regulator 5.

A valve 7 is disposed within the supply pipe 2 and a lever 8 is associated with the valve stem and and is adapted for regulating the amount of heat to be supplied to the heat transformer 1. A plurality of gas thermostats 9 are placed within the room 3 and are spaced apart upon a supporting line 10. One end of the line 10 is secured to the wall 11 of the room, or to any other fixed support. The line 10 is trained about a pulley 12 and is secured upon its oppositely disposed end to the lever 8 of the valve. The valve may then be actuated through the action of the heat regulator 5 that determines the maximum temperature that may be developed within the heat transformer 1, or the lever 8 may be actuated through the combined action of the thermostats 9.

The thermostats 9 may be made as illustrated in Figs. 2 and 3 and when so made, a plurality of gas wafers 13 of any suitable make are expandably secured together so that a multiplication of the expansion may result. The end wafers 14 and 15 are secured to stub shafts 16 and the stub shafts are fixedly secured to the yokes 17 and 18 respectively. Rods 19 and 20 connect the yoke 17 with the yoke 21. The rods being adapted for predetermining the set distance between the respective yokes by having nuts 22 and 23 threadedly disposed upon the respective bolts. Rods 24 and 25 connect the yokes 26 and 27 with adjustment being provided between the respective yokes. An eye bolt 28 is disposed central of the yoke 21 and an eye bolt 29 is disposed central of the yoke 26. The rods 19 and 20 pass through and are adapted to have the yokes 18 slide thereupon and the guide bar 30 and 31 are secured to the yoke 17 and the lines are adapted to have the yoke 26 slide thereupon. This form of construction is adapted for being used and for controlling the valve 7 through an average of temperature developed at the respective thermostats 9 disposed upon the pull line 10.

These thermostats may be arranged horizontally and in tandem as illustrated in Fig. 1, or the same may be placed vertically, and spaced apart as illustrated in Fig. 5, wherein one end of the line 32 is secured to a bracket 33 that is fixed and the oppositely disposed end of the line is secured to a counterweighted lever 34. The counterweighted lever 34 terminates its free end in close proximity to an outwardly projecting arm 35 that is associated with a mercury switch 36. The mercury switch being disposed within a box like structure 37. As the temperature rises the spaced thermostats 38 exert a pull upon the line 32 and the mercury switch. This pull tilts the switch as illustrated in Fig. 7 to break the electric circuit and in doing so an electric prime mover 39 fails to be energized and heat is temporarily shut off in the boiler 40. Either of the lines 10 or 32 may be connected to a counterweighted lever 44 as illustrated in Fig. 4 and the lever being used to manipulate and open and close the valve 45 to thereby predetermine the amount of heated fluid that may be permitted to flow through the pipe 46, into the heat interchanger 47, or to by-pass the heated fluid there around through the by-pass pipe 48.

While the form of mechanism herein shown and described is admirably adapted to fulfill the objects primarily stated, it is to be understood that it is not intended to confine the invention to the one form of embodiment herein shown and described, as it is susceptible of embodiment in various forms, all coming within the scope of the claims which follow.

What I claim is:

1. In a device of the class described, including heat regulating elements, the combination of a control cable extending from said elements for remote control thereof through a plurality of chambers, and temperature influenced expansible means spaced apart within the cable for actuating said heat regulating elements, said expansible means including a plurality of thermostats mounted within an expansible frame to which ends of the cable are attached.

2. In a device of the class described including heat regulating elements, the combination of a control cable extending from said elements for remote control thereof through a plurality of chambers, a plurality of expansible units interposed between the ends of the cable, each of said units comprising a pair of frames slidably mounted with respect to each other and interconnected by a gas thermostat.

3. In a device of the class described including heat regulating elements, the combination of a control cable made up of sections and extending from said elements for remote control thereof, a temperature influenced expansible and contractable unit interconnecting each of said cable sections.

4. In a device of the class described including heat regulating elements, the combination of a control cable made up of sections and extending from said elements for remote control thereof, a temperature influenced expansible and contractable unit interconnecting each of said cable sections, each of said units comprising a pair of frames slidable with respect to each other and in alignment with each other.

5. In a device of the class described including heat regulating elements, the combination of a control cable made up of sections and extending from said elements for remote control thereof, a temperature influenced expansible and contractable unit interconnecting each of said cable sections, each of said units comprising a pair of frames slidable with respect to each other and in alignment with each other, and a gas thermostat yieldingly connecting one end of one frame with the opposite end of the other frame.

CHARLES E. ARMSTRONG.